United States Patent
Probert et al.

(10) Patent No.: US 7,756,841 B2
(45) Date of Patent: Jul. 13, 2010

(54) SYSTEM AND METHOD FOR IDENTITY DECISIONS AND INVALIDATION

(75) Inventors: David B. Probert, Woodinville, WA (US); Eric Li, Redmond, WA (US); Genevieve Fernandes, Redmond, WA (US); John Rector, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 681 days.

(21) Appl. No.: 11/087,222

(22) Filed: Mar. 22, 2005

(65) Prior Publication Data

US 2006/0218389 A1    Sep. 28, 2006

(51) Int. Cl.
*G06F 17/30* (2006.01)
(52) U.S. Cl. ........................ 707/690; 707/701
(58) Field of Classification Search .............. None
See application file for complete search history.

(56) References Cited

U.S. PATENT DOCUMENTS

| 7,124,249 B1* | 10/2006 | Darcy ................. 711/122 |
| 2004/0001568 A1* | 1/2004 | Impson et al. ............. 378/60 |
| 2004/0117386 A1* | 6/2004 | Lavender et al. ........ 707/100 |
| 2005/0091192 A1 | 4/2005 | Probert et al. |
| 2005/0091535 A1 | 4/2005 | Kavalam et al. |
| 2005/0091655 A1 | 4/2005 | Probert et al. |
| 2005/0108191 A1* | 5/2005 | Iyengar et al. ............. 707/1 |
| 2005/0120181 A1* | 6/2005 | Arunagirinathan et al. .. 711/133 |

OTHER PUBLICATIONS

James Tam, Change Management, Mar. 26-29, 2000, In Proceedings of the Western Computer Graphics Symposium 2000.*

* cited by examiner

*Primary Examiner*—John E Breene
*Assistant Examiner*—Thu-Nguyet Le
(74) *Attorney, Agent, or Firm*—Wolf, Greenfield & Sacks, P.C.

(57) ABSTRACT

A system and method for identity decisions and invalidation. Modified objects (e.g., files, executables, etc.) are flagged for reevaluation. Privileges associated with the object are only persisted if the modifications are determined to be authorized (e.g., updates and patches). In one embodiment, a tagging system registers to be notified of all writes, renames, truncations, moves, deletions, or any other relevant modifications to objects. If the tagging system detects a modification operation targeting the object, it invalidates all identity decisions cached with the object. The next time the object runs, the system does not recognize the object and it is forced to reevaluate its identity. Thus, patching and other write operations are still permitted, but the system detects the changed object and reevaluates the identity.

18 Claims, 9 Drawing Sheets

| 210 PROVIDER | 220 PROVIDER SEQUENCE NUMBER | 230 PROVIDER DECISION METADATA FOR OBJECT |
| --- | --- | --- |
| PROVIDER 1 | (SEQUENCE NUMBER) | (DECISION METADATA) |
| PROVIDER 2 | (SEQUENCE NUMBER) | (DECISION METADATA) |
| PROVIDER 3 | (SEQUENCE NUMBER) | (DECISION METADATA) |

PER IDENTITY TABLE

*Fig.2A.*

| 250 | 260 |
| --- | --- |
| PROVIDER 1 | (SEQUENCE NUMBER) |
| PROVIDER 2 | (SEQUENCE NUMBER) |
| PROVIDER 3 | (SEQUENCE NUMBER) |

GLOBAL CURRENT SEQUENCE NUMBER TABLE

*Fig.2B.*

SYSTEM AND METHOD FOR IDENTITY DECISIONS AND INVALIDATION

FIELD OF THE INVENTION

The embodiment of the present invention relates to identities in a computer system, and more particularly, to a system and method for identity decisions and invalidation.

BACKGROUND OF THE INVENTION

Spoofing and impersonation software attacks take advantage of the privileges assigned to executable objects to achieve their nefarious ends. Typically, the attack modifies the executable to perform the malicious acts using (implicit or explicit) privileges or capabilities associated with the unmodified executable. This vulnerability can be addressed by altering the ACL governing the executable to make it non-writable, but this approach also prevents patching and upgrading of the executable.

The embodiment of the present invention is directed to providing a system and method that overcome the foregoing and other disadvantages. More specifically, the present invention is directed to an improved system and method for identity decisions and invalidation.

SUMMARY OF THE INVENTION

A system and method for identity decisions and invalidation is provided. Related methods are described in U.S. patent application Ser. No. 10/938,126, filed Sep. 10, 2004, U.S. patent application Ser. No. 10/963,479, filed Oct. 12, 2004, and U.S. patent application Ser. No. 10/868,183, filed Jun. 15, 2004, each of which is hereby incorporated by reference in its entirety. In accordance with one aspect of the invention, modified objects are flagged for reevaluation. Privileges and decisions associated with the object are only persisted if the modifications are determined to be authorized (e.g., updates and patches). In one embodiment, a tagging system registers to be notified of all writes, renames, truncations, moves, deletions, and any other relevant modifications to the object. If the tagging system detects a modification operation targeting the object, it invalidates all identity decisions cached with the object. The next time the object runs, the system does not recognize the object and it is forced to reevaluate its identity. Thus, patching and other write operations are still permitted, but the system detects the changed object and reevaluates the identity. It will be appreciated that the embodiment of the present invention is intended as an improvement on computing a hash or signature of the object and checking the object each time it is executed, because, in the absence of any writes, there is no significant per run computational cost. This avoids slowing down normal process creation, DLL loads, or other file accesses while computing the hash. Additional implementations may also be envisioned in which the system responds to the appropriate notifications that the target object has/will/might change by deleting the corresponding identity data stored for the target object.

In accordance with another aspect of the invention, the system includes an ID engine, a sources ID manifest, decision makers, a metadata cache, and metadata providers (policy engines). The ID engine generates identifications for particular applications and the objects, such as executables, associated with them, and may include a detection component, a protection component, an invalidation component, and a cache for object/identity. The identification engine and decision makers may exchange information regarding objects and identifications. The decision makers and metadata cache may exchange information regarding identifications and metadata. The metadata cache may include an invalidation engine, which is used to invalidate the identity metadata that is cached for an object when a change is detected to the object.

In accordance with another aspect of the invention, a per-identity table and a global current sequence number table are maintained. The sequence numbers of the tables are associated with metadata providers, which provide information about the innate characteristics of the application as well as encapsulating explicit policies of the system. A sequence number from the per identity table for an associated provider is compared to the corresponding sequence number from the global current sequence number table to determine if the provider will be invoked to generate current metadata for the identity.

In accordance with another aspect of the invention, for untrusted media, such as removable media or an insecure file system, such as FAT, the system may detect that the object is stored on untrusted media, and copy the target object into a trusted directory (perhaps on non-removable or otherwise secured media, such as an NTFS directory with proper ACLs). The identity may then be recomputed on the trusted copy. A determination may then be made as to whether the system has notifications for media removal and media arrival (as well as across system reboots). If the system has such notifications, then the ID may be cached. If the system does not have such notifications, then the ID may not be cached (in other words, the local copy may essentially be thrown out in that it will not have a cached ID and will have to be recopied and have the ID recomputed each time.) The identification is then returned. In a system which has notifications for media removal (as well as across system reboots), if a notification of media removal (or change notification in some file systems) or reboot is received, then the media's cache may be invalidated. It will be appreciated that other embodiments of this routine for untrusted media may also be envisioned, and that the general point is that the correctness of the system depends on reliable change notifications, which prompt the invalidation of the media's cache. A media removal notification is one example, a per-file change notification is another. In many systems, such reliable change notifications may be available. In cases where they are not, whether it is because the media doesn't support a removal notice or the file system doesn't support the necessary per-file changes, or in general if the file system is not trusted, the fall back is the "recomputed on every run" alternative described above where the ID is not cached and is recomputed each time. In general the "recomputed on every run" alternative will be slower, but may be preferred in cases where reliable change notifications are not available.

In accordance with another aspect of the invention, for a network volume system, the operating system may detect such volumes and copy the object into a secure directory (on the local system or to a trusted network location). If the remote system or object store is not trusted, or if a determination is made that the object was changed during the copying, then the identity is recomputed on the trusted copy. If the system and object are trusted, and if there were no changes to the object during the copying, then the identification is obtained from the trusted system. With regard to this routine for network volumes, it will be appreciated that in one embodiment a local copy does not need to be made for all network volumes. Instead, a local copy is only made for untrusted network volumes. If the remote machine is trusted, and if the remote machine is able to send reliable change notifications, then the system doesn't have to fall back to copying it locally and recomputing the identification every time. Instead, it may be treated like a file on a trusted local volume.

In accordance with another aspect of the invention, for a multi-boot system, the tagging system stores a unique identifier denoting the current executing operating system to uniquely denote which operating system is identified and the associated data for the object. When the system accesses the stored data, the currently executing operating system identification gets checked against the stored operating system identification with the data. If there is a mismatch of operating system IDs, then the system invalidates the stored identity and data and reevaluates the object's identity and stores the current data along with the current operating system identification.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2A is a diagram of a per-identity table;

FIG. 2B is a diagram of a global current sequence number table;

DETAILED DESCRIPTION OF THE PREFERRED EMBODIMENT

Figure 1:
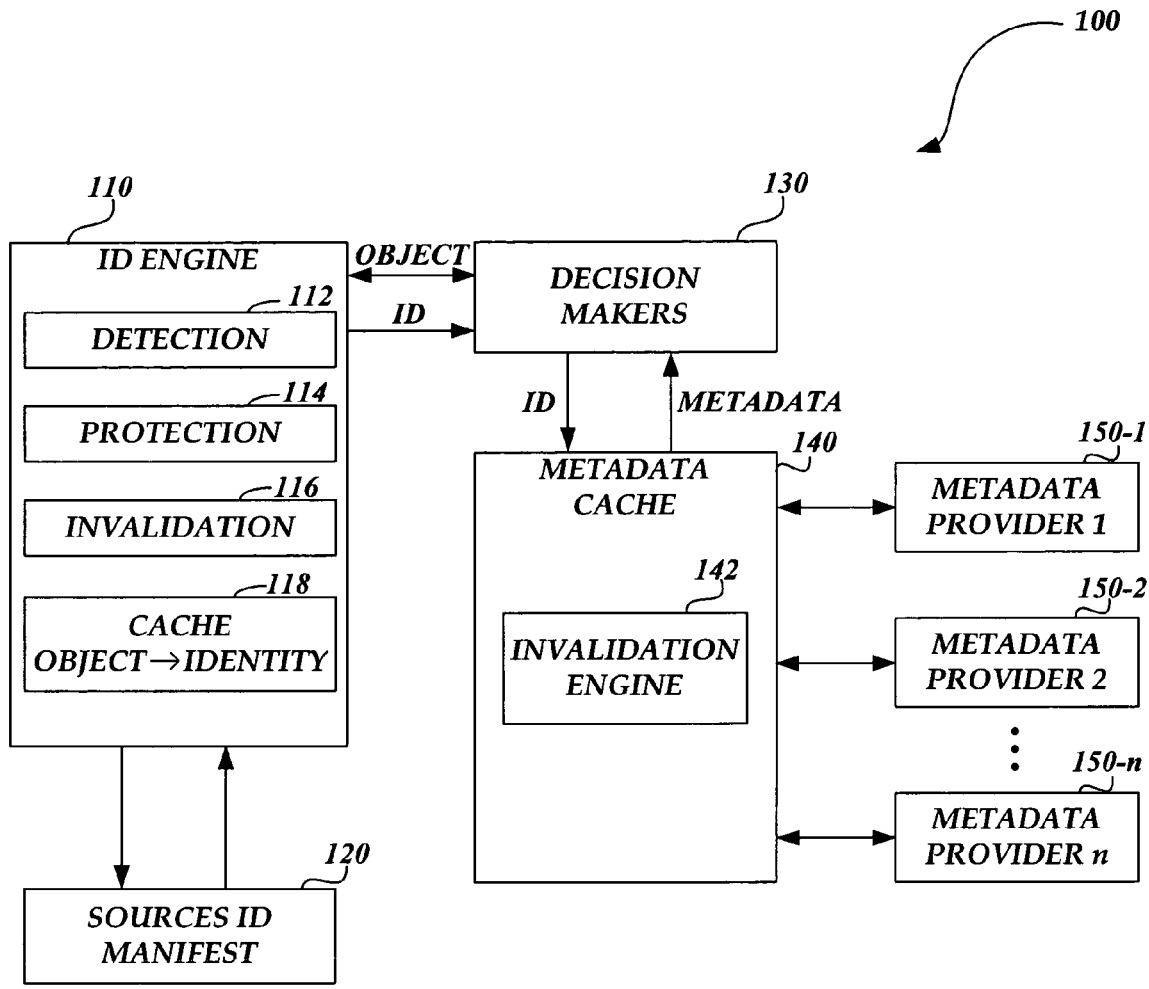
FIG. 1 is a block diagram of a system for identity decisions and invalidations.

FIG. 1 is a block diagram of an identity decision system 100 in accordance with the embodiment of the present invention. As shown in FIG. 1, the identity decision system 100 includes an ID engine 110, a sources ID manifest 120, decision makers 130, a metadata cache 140, and metadata providers 150. The ID engine 110 generates identifications and may include a detection component 112, a protection component 114, an invalidation component 116, and an object identity cache 118. The identification engine 110 and decision makers 130 exchange information regarding objects and identifications. The decision makers 130 and metadata cache 140 exchange information regarding identifications and metadata. The metadata cache 140 includes an invalidation engine 142, which is utilized to invalidate identity metadata that is cached for an object under certain conditions, such as when a change is detected to the object. In one embodiment, the decision metadata may be invalidated either when the object is modified, or as initiated by the metadata provider due to changes in policy. As will be described in more detail below with reference to FIGS. 2A and 2B, a per identity table and a global current sequence number table may be maintained, and a sequence number for a provider from the per identity table may be compared with the provider's current sequence number from the global table to determine if the provider will be invoked to generate current metadata for the current identity.

FIG. 2A is a diagram of a per identity table 200A. As will be described in more detail below, the table 200A illustrates how in a cache to go from the object ID to the decision metadata for a provider. As shown in FIG. 2A, the per identity table 200A includes a provider column 210, a provider sequence number column 220, and a provider decision metadata for the object column 230. The provider column 210 lists various providers (e.g., provider 1, provider 2, provider 3, etc.). The provider sequence number column 220 includes sequence numbers for each of the associated providers. The provider decision metadata for the object column 230 includes decision metadata. In one embodiment, the sequence numbers of the provider sequence number column 220 may be thought of as being comparable to time stamps, in that they are compared to sequence numbers from another table (see FIG. 2B), as will be described in more detail below.

FIG. 2B is a diagram of a global current sequence number table 200B. As shown in FIG. 2B, the global current sequence number table 200B includes a provider column 250 and a sequence number column 260. The provider column 250 lists various providers (e.g., provider 1, provider 2, provider 3, etc.), while the sequence number column 260 lists the current sequence numbers associated with each of the providers. As will be described in more detail below with reference to FIG. 3, a sequence number from the sequence number column 220 of FIG. 2A is compared with a current sequence number from the sequence number column 260 of FIG. 2B to determine if the provider will be invoked to generate current metadata for the current identity.

Figure 3:
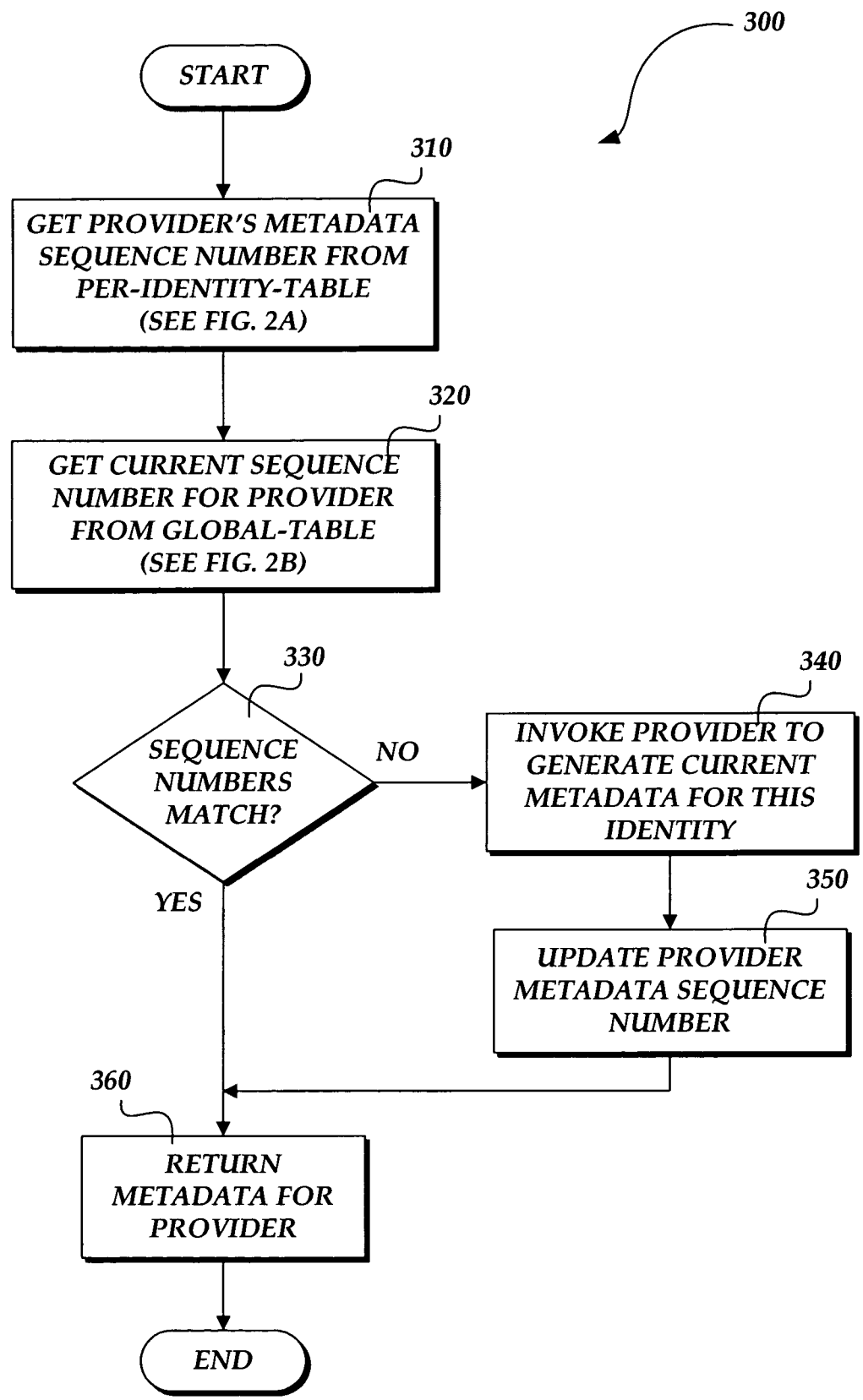
FIG. 3 is a flow diagram illustrative of a general routine for obtaining valid decision metadata for an identity utilizing the tables of FIGS. 2A and 2B.

FIG. 3 is a flow diagram illustrative of a general routine 300 for obtaining valid decision metadata for an identity utilizing the tables of FIGS. 2A and 2B. As shown in FIG. 3, at a block 310, the sequence number for a provider's metadata is obtained from a per identity table (e.g., see per identity table 200A of FIG. 2A). At a block 320, a current sequence number for the provider is obtained from a global table (e.g., see global current sequence number table 200B of FIG. 2B).

At a decision block 330, a determination is made as to whether the sequence numbers match. If the sequence numbers match, then the routine continues to a block 360, as will be described in more detail below. If the sequence numbers do not match, then the routine continues to a block 340. At block 340, the provider is invoked to generate current metadata for the current identity. At a block 350, the generated metadata is cached and the provider metadata sequence number is updated in the per identity table. At the block 360, the metadata is returned for the provider.

Figure 4:
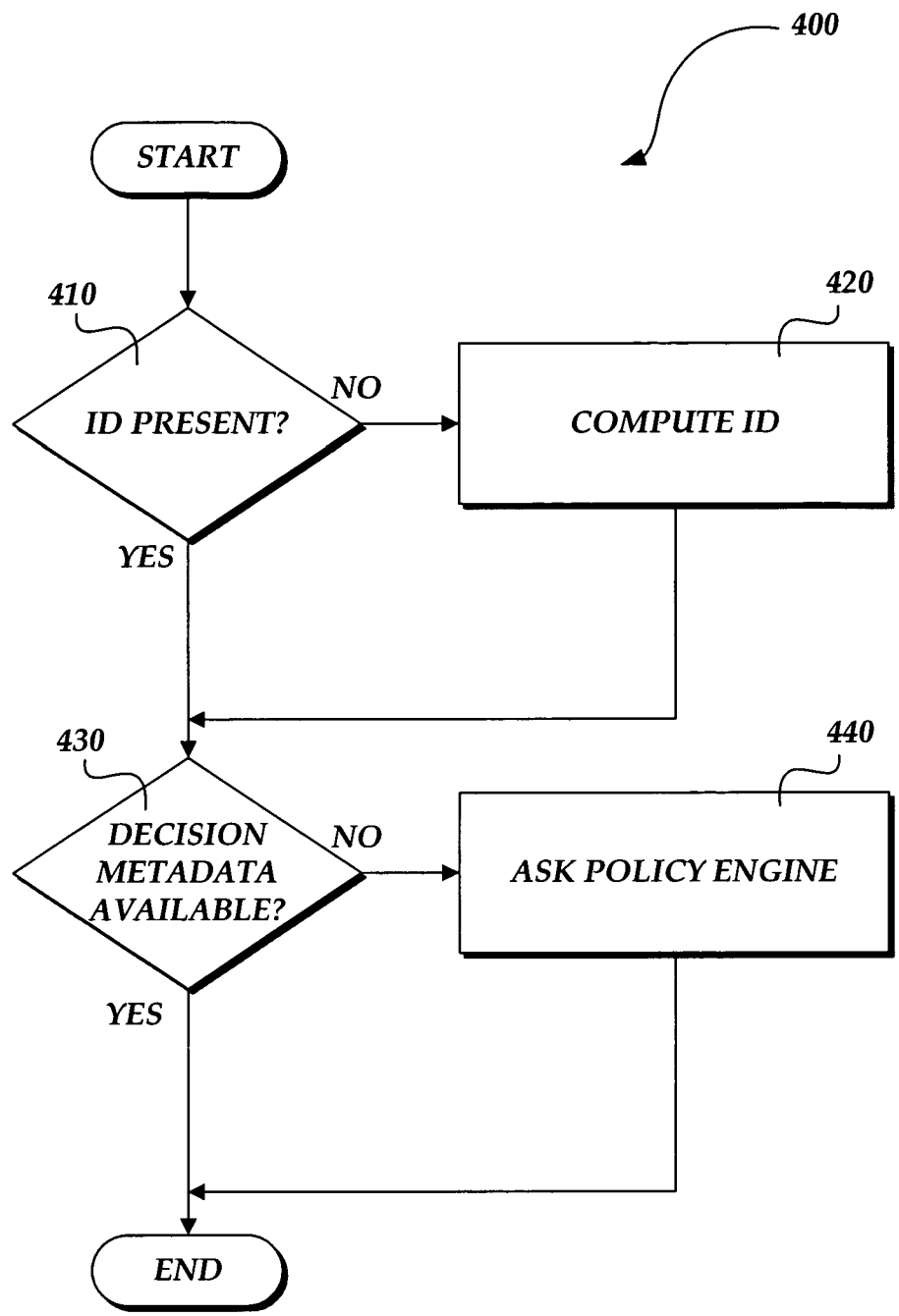
FIG. 4 is a flow diagram illustrative of a routine for retrieving decision metadata for an object.

FIG. 4 is a flow diagram illustrative of a routine 400 for retrieving decision metadata for an object (e.g., an object may be a file, an executable, etc.). At a decision block 410, a determination is made as to whether an identity is present for the object. If an identity is present, then the routine continues to a decision block 430, as will be described in more detail below. If an identity is not present, then the routine continues to a block 420, where an identity is computed.

At decision block 430, a determination is made as to whether the decision metadata for the object is available. If the decision metadata is available, then the routine ends. If the decision metadata is not available, then the routine continues to a block 440, where the policy engine is asked to provide the decision metadata for the identified object.

Figure 5:
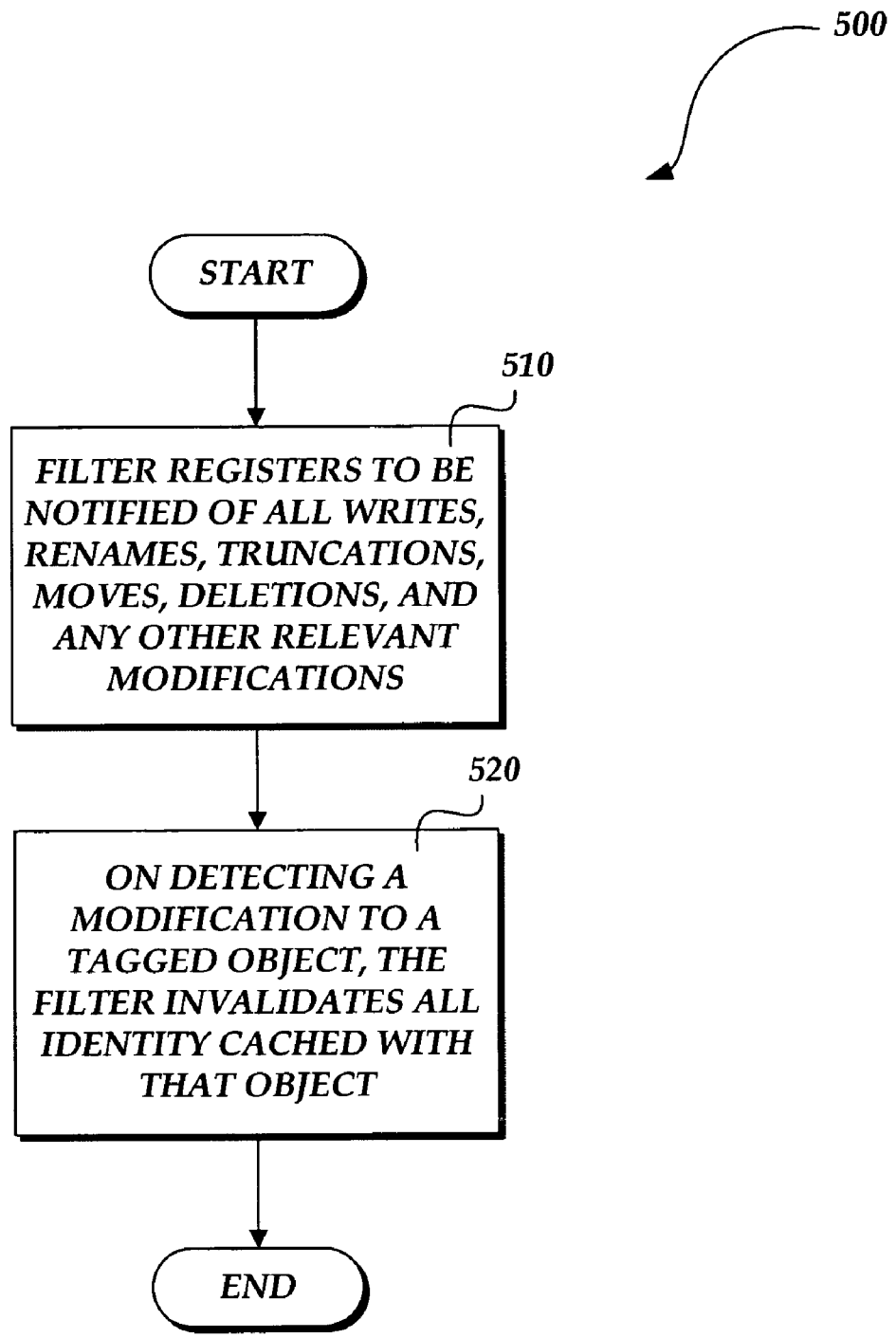
FIG. 5 is a flow diagram illustrative of a routine for the revocation of identity data associated with an object based on notification of changes to the object, e.g. by a filter.

FIG. 5 is a flow diagram illustrative of a routine 500 for revocation of an identity associated with an object. At a block 510, a filter registers to be notified of all writes, renames, truncations, moves, deletions, and any other relevant modifications. The filter can be implemented as a filter on file system operations, or use notifications (such as OpLocks) or other synchronous callback mechanisms to detect modification. At a block 520, upon detecting a modification to a tagged object, the filter invalidates all identity cached with that object.

As will be described in more detail below with regard to FIGS. 6A, 6B, and 7, removable media and network volumes are notable since a malicious user may alter the object/file beyond the detection of the local system. Since an ordinary user may control a network volume, they may tamper with a network object/file after the tagging system stores the identity and the data. Similarly, with removable media, the user may remove the media and change the contents on a different operating system. As will be described in more detail below with regard to FIGS. 6A, 6B, and 7, a copy mechanism may be utilized as part of the identity process.

Figure 6A:
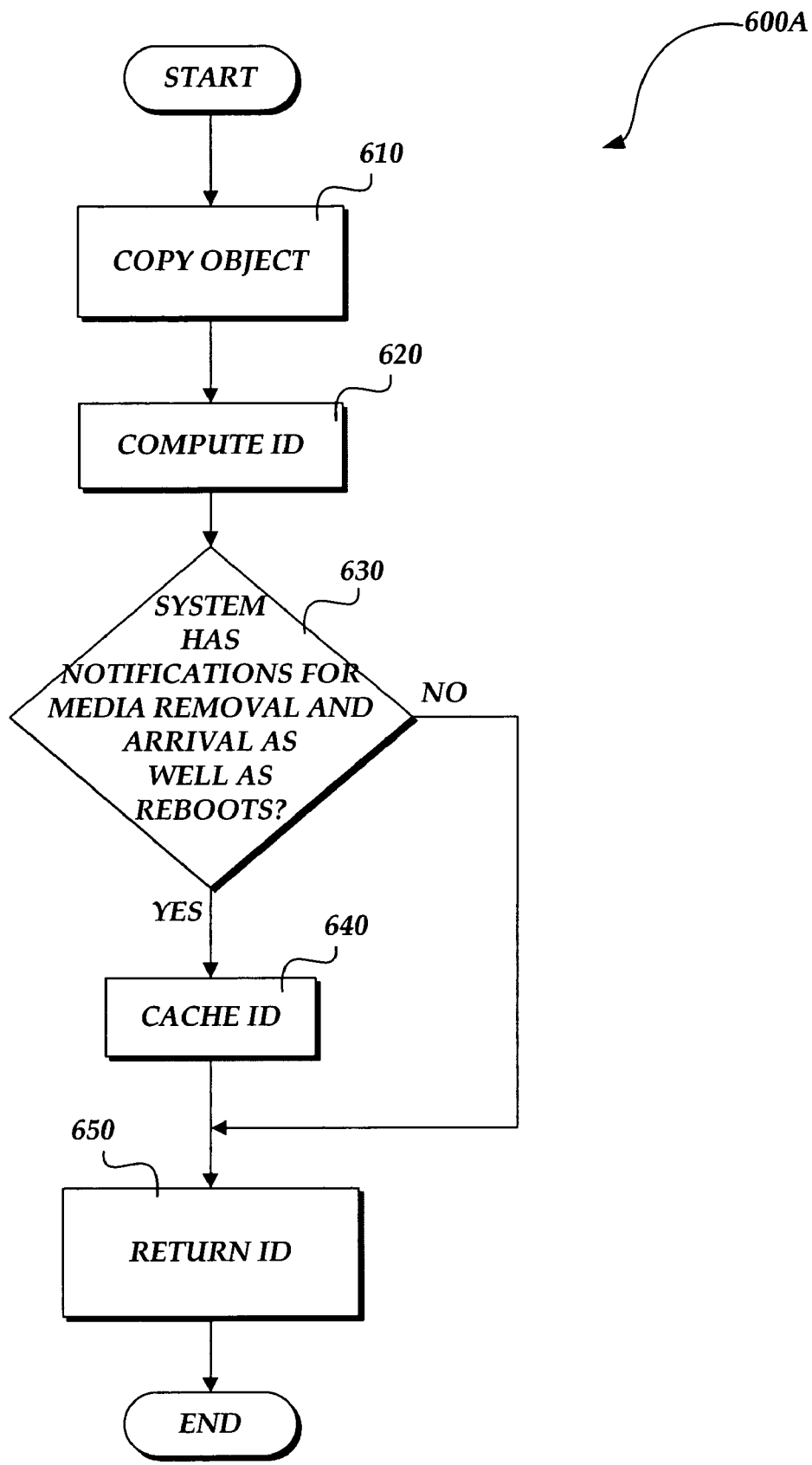
FIGS. 6A and 6B are flow diagrams illustrative of a routine for associating identities with objects on removable media.
Figure 6B:
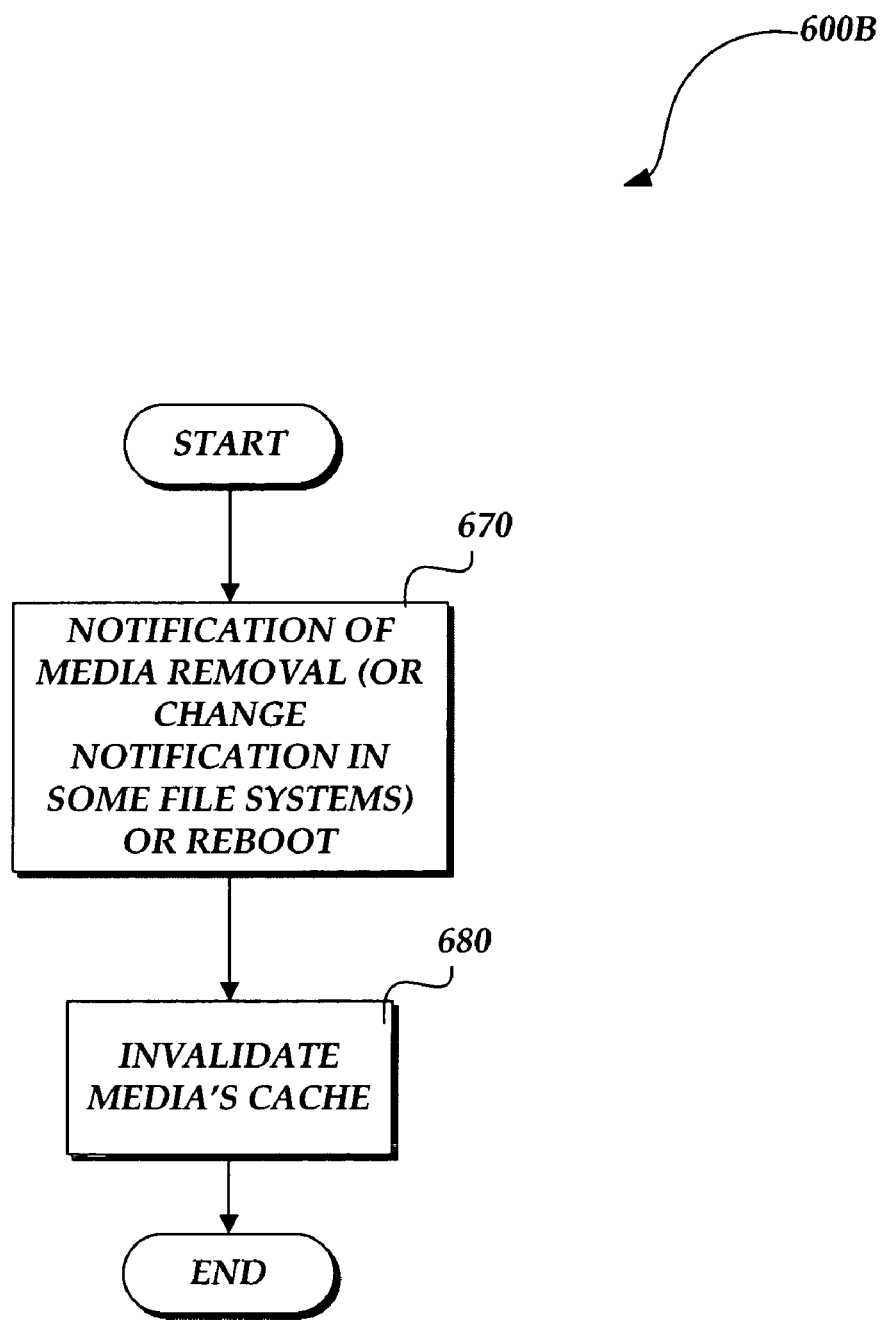

FIGS. 6A and 6B are flow diagrams illustrative of routines 600A and 600B for associating identities with objects on removable media. As shown in FIG. 6A, at a block 610, an object is copied. (In another embodiment, the copy may be avoided if the system can securely store the cache ID and upon media insertion any existing cached identity and data are deleted for that media.) At a block 620, the identity is computed. At a decision block 630, a determination is made as to whether the system has notifications for media removal and media arrival (as well as across system reboots). If the system does not have such notifications, then the identity may not be cached and the routine continues to block 650, as will be described in more detail below (in other words, the local copy may essentially be thrown out in that it will not have a cached identity and will have to be recopied and have the identity recomputed each time). If the system has such notifications, then the routine continues to block 640, where the identification is cached. At the block 650, the identification is returned.

It will be appreciated that other embodiments of this routine for untrusted media may also be envisioned, and that the general point is that the correctness of the system depends on reliable change notifications, which prompt the invalidation of the media's cache. A media removal notification is one example, a per-file change notification is another. In many systems, such reliable change notifications may be available. In cases where they are not, whether it is because the media doesn't support a removal notice or the file system doesn't support the necessary per-file changes, or in general if the file system is not trusted, the fall back is the "recomputed on every run" alternative described above where the ID is not cached and is recomputed each time. In general the "recomputed on every run" alternative will be slower, but may be preferred in cases where reliable change notifications are not available.

FIG. 6B is a flow diagram illustrative of a routine 600B for invalidating a removable media's cache. As shown in FIG. 6B, at a block 670, a notification of media removal (or change notification in some file systems) or reboot is received. At a block 680, the media's cache is invalidated.

Figure 7:
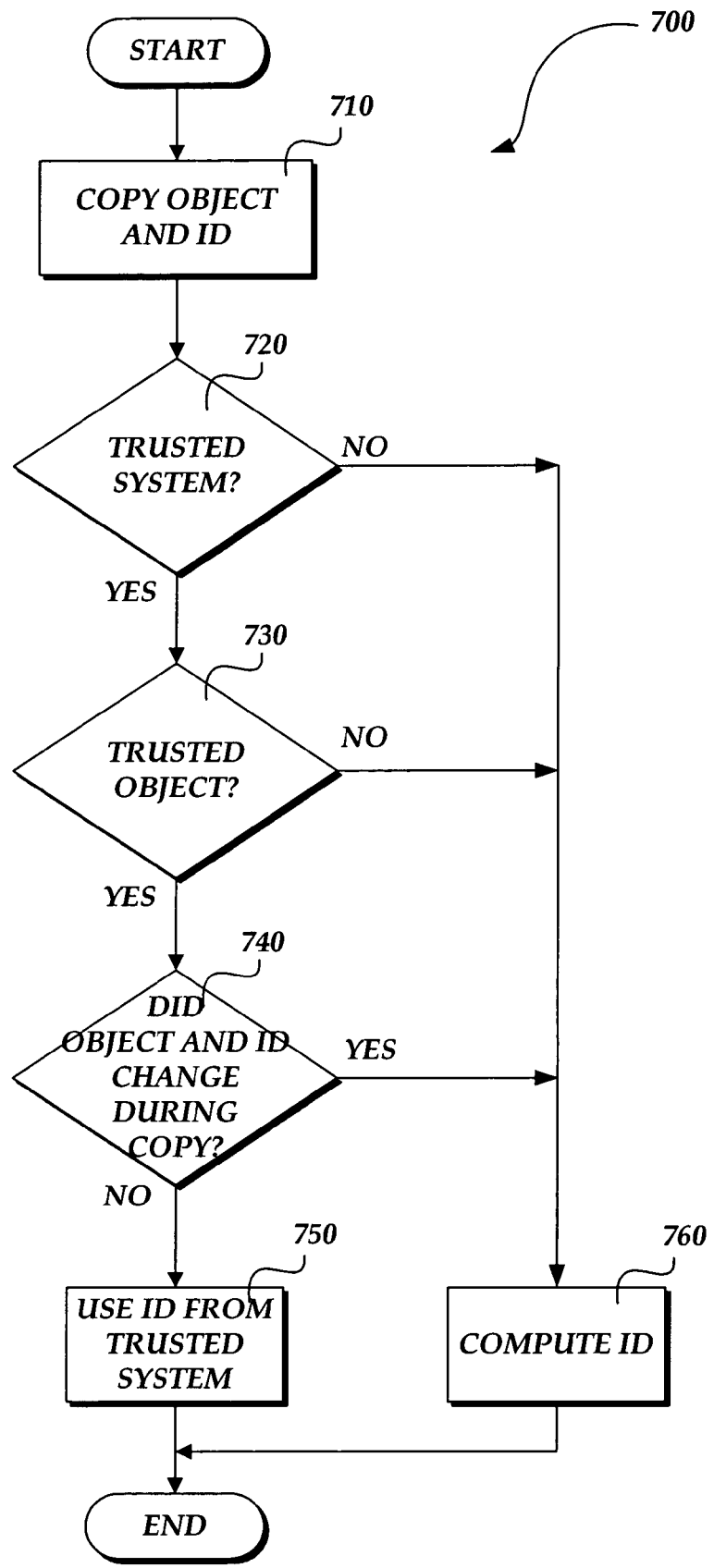
FIG. 7 is a flow diagram illustrative of a routine for associating identities with objects on network volumes.

FIG. 7 is a flow diagram illustrative of a routine 700 for associating identities with objects on a network volume system. At a block 710, an object and ID are copied. In another embodiment, only the object may be copied at the block 710, however the copying of both the object and ID provides more of an atomic mechanism, and the ID is not used until a determination is made that the object and ID were not changed, as will be described in more detail below with respect to block 740. At a decision block 720, a determination is made as to whether the system is trusted. If the system is not trusted, then the routine continues to a block 760, where the identity is computed. If the system is trusted, then the routine continues to a decision block 730. At decision block 730, a determination is made as to whether the object is trusted. If the object is not trusted, then the routine continues to the block 760 where the identity is computed. If the object is trusted, then the routine continues to a decision block 740. At decision block 740, a determination is made as to whether the object was changed during the copying. If the object and ID were changed, then the routine continues to block 760 where the identity is computed. If the object and ID were not changed during the copying, then the routine continues to a block 750, where the identity is obtained from the trusted system. In some embodiments, an ID might not be present, in which case the system may also make a determination prior to block 750 whether an ID was provided, and if an ID was provided, then at block 750 the ID is used, while if an ID was not provided, then the routine would continue to block 760.

With regard to the routine 700 for network volumes, it will be appreciated that in one embodiment a local copy does not need to be made for all network volumes. Instead, a local copy is only made for untrusted network volumes. If the remote machine is trusted, and if the remote machine is able to send reliable change notifications, then the system doesn't have to fall back to copying it locally and recomputing the identification every time. Instead, it may be treated like a file on a trusted local volume.

Figure 8:
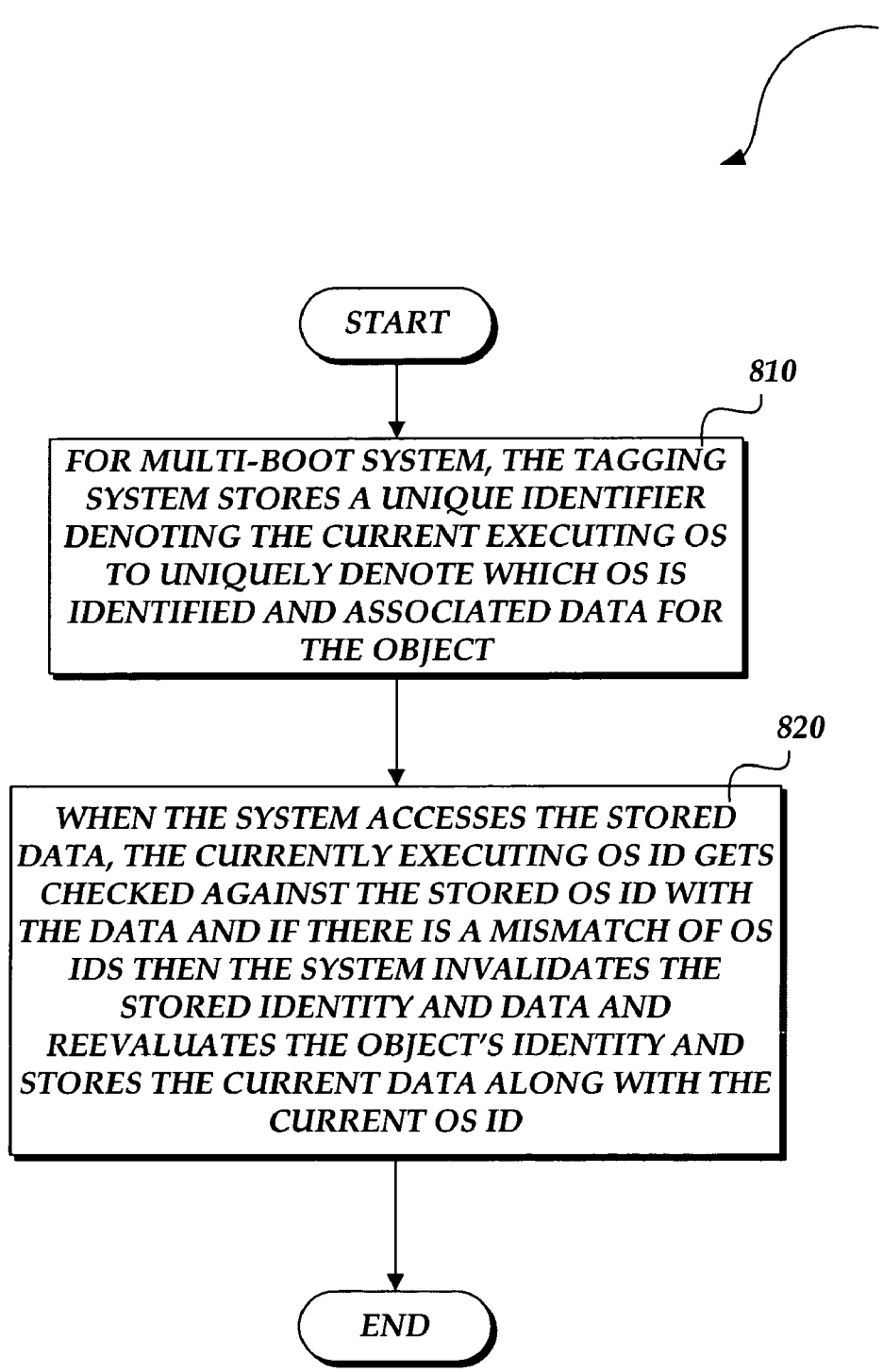
FIG. 8 is a flow diagram illustrative of a routine for associating identities with objects in a multi-boot system.

FIG. 8 is a flow diagram illustrative of a routine 800 for associating identities with objects in a multi-boot system. At a block 810, the tagging system stores a unique identifier denoting the current executing operating system to uniquely denote which operating system is identified and the associated data for the object. At a block 820, when the system accesses the stored data, the currently executing operating system identification gets checked against the stored operating system identification with the data, and if there is a mismatch of the operating system's identifications, then the system invalidates the stored identity and data and reevaluates/verifies the object's identity and stores the current data along with the current operating system identification.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for identity decisions, comprising:
   registering to automatically receive at least one change notification on at least one modification to an executable object resulting in a modified executable object, wherein, prior to the at least one modification, identity privileges and decisions regarding an identity of the executable object are cached for the executable object;
   flagging the modified executable object for reevaluation;
   upon automatically receiving the at least one change notification, invalidating all of the identity privileges and decisions cached for the executable object;
   when the modified executable object is flagged for the reevaluation, recomputing an identity of the modified executable object;
   recomputing the identity privileges and decisions of the modified executable object only when the modified executable object is needed to be executed; and
   the executable object is associated with a removable media, and wherein, if media-removed change notifications are not supported, the executable object is copied locally into a local copy and all of the identity privileges and decisions associated with the executable object prior to modifying the executable object are computed on the local copy.

2. The method of claim 1, wherein the at least one modification to the executable object comprises at least one of one or more writes, renames, truncations, moves, and deletions.

3. The method of claim 1, wherein after all of the cached identity privileges and decisions are invalidated, new identity privileges and decisions are recomputed prior to executing the modified executable object.

4. The method of claim 1, wherein if the at least one modification to the executable object is determined to be authorized, all of the identity privileges and decisions associated with the executable object prior to modifying the executable object are persisted.

5. The method of claim 1, wherein the executable object is associated with a network volume, and wherein, if the network volume is not trusted, the executable object is copied locally into a local copy and all of the identity privileges and decisions associated with the executable object prior to modifying the executable object are computed on the local copy.

6. The method of claim 1, wherein the executable object is associated with a multi-boot system, and wherein operating system identifications are stored and when the multi-boot system accesses a stored data for the modified executable object, a currently executing operating system identification is checked against the stored operating system identifications, and if there is a mismatch of the currently executing operating system identification and its stored identification from the stored operating system identifications, invalidating all of the identity privileges and decisions cached for the executable object prior to modifying the executable object.

7. A computer system for identity decisions, comprising:
a detection module for automatically receiving change notifications on at least one modification to executable objects resulting in modified executable objects, wherein, prior to the at least one modification, identity metadata regarding an identity of the executable objects are cached for the executable objects;
a protection module for flagging the modified executable objects for reevaluation;
a cache for caching the identity metadata for the executable objects prior to modifying the executable objects;
an invalidation engine for invalidating the identity metadata cached for the executable objects prior to modifying the executable objects;
a computer for recomputing the identity privileges and decisions of the modified executable object only when the modified executable object is needed to be executed; and
the executable object is associated with a removable media, and wherein, if media-removed change notifications are not supported, the executable object is copied locally into a local copy and all of the identity privileges and decisions associated with the executable object prior to modifying the executable object are computed on the local copy.

8. The computer system of claim 7, wherein the cache receives the identity metadata from a plurality of metadata providers.

9. The computer system of claim 8, wherein the computer system further comprises an identity engine which generates identity metadata for the modified executable objects.

10. The computer system of claim 9, wherein the computer system further comprises a plurality of decision makers which exchange information regarding the modified executable objects and the identity metadata for the modified executable objects with the identity engine and which provide information regarding the identity metadata for the modified executable objects to the cache and which retrieve the cached identity metadata for the executable objects from the cache prior to modifying the executable objects.

11. The computer system of claim 10, wherein the computer system maintains a per-identity table which associates each of the plurality of metadata providers with a corresponding sequence number and decision metadata for the executable objects.

12. The computer system of claim 11, wherein the computer system maintains a global current sequence number table which associates each of the plurality of metadata providers with a corresponding current sequence number.

13. The computer system of claim 12, wherein in order to obtain a valid decision metadata for an executable object, a metadata provider's sequence number is obtained from the per-identity table and is compared with the current sequence number for the metadata provider from the global current sequence number table, and if there is a mismatch of the metadata provider's sequence number and its current sequence number, the metadata provider is invoked to generate current metadata for the executable object prior to executing the decision metadata for the executable object.

14. One or more computer-readable storage media having stored thereon a computer program segment that when executed by a computer performs identity decisions, said computer-readable storage media comprising:
a set of computer-executable instructions that when executed by the computer:
register change notifications automatically received on at least one modification to an executable object resulting in a modified executable object, wherein, prior to the at least one modification, identity privileges and decisions regarding an identity of the executable object are cached for the executable object;
flag the modified executable object for reevaluation;
invalidate all of the identity privileges and decisions cached for the executable object;
when the modified executable object is flagged for the reevaluation, computing an identity of the modified executable object; and
recompute the identity privileges and decisions of the modified executable object only when the modified executable object is needed to be executed; and
the executable object is associated with a removable media, and wherein, if media-removed change notifications are not supported, the executable object is copied locally into a local copy and all of the identity privileges and decisions associated with the executable object prior to modifying the executable object are computed on the local copy.

15. The storage media of claim 14, wherein the at least one modification to the executable object comprises at least one of one or more writes, renames, truncations, moves, and deletions.

16. The storage media of claim 14, wherein after all of the cached identity privileges and decisions are invalidated, new identity privileges and decisions are recomputed prior to executing the modified executable object.

17. The storage media of claim 14, wherein the executable object is associated with a network volume, and wherein, if the network volume is not trusted, the executable object is copied locally into a local copy and all identity privileges and decisions associated with the executable object prior to modifying the executable object are computed on the local copy.

18. The storage media of claim 14, wherein the executable object is associated with a multi-boot system, and wherein operating system identifications are stored, and when the multi-boot system accesses a stored data for the modified object, a currently executing operating system identification is checked against the stored operating system identifications, and if there is a mismatch of the currently executing operating system identification and its stored identification from the stored operating system identifications, invalidating all of the identity privileges and decisions cached for the executable object prior modifying the executable object.

* * * * *